(12) United States Patent
Sharma et al.

(10) Patent No.: US 8,712,822 B2
(45) Date of Patent: Apr. 29, 2014

(54) REAL-TIME DEMAND PREDICTION IN A FAST SERVICE RESTAURANT ENVIRONMENT

(75) Inventors: Abhishek Sharma, Pittsburgh, PA (US); Robert Craig Coulter, Apollo, PA (US); Kerien W. Fitzpatrick, Sewickley, PA (US)

(73) Assignee: HyperActive Technologies, Inc., Pittsburgh, PA (US)

( * ) Notice: Subject to any disclaimer, the term of this patent is extended or adjusted under 35 U.S.C. 154(b) by 701 days.

(21) Appl. No.: 11/951,538

(22) Filed: Dec. 6, 2007

(65) Prior Publication Data

US 2008/0140511 A1 Jun. 12, 2008

Related U.S. Application Data

(60) Provisional application No. 60/873,397, filed on Dec. 7, 2006.

(51) Int. Cl.
*G06Q 10/00* (2012.01)

(52) U.S. Cl.
USPC ........................................................ 705/7.31

(58) Field of Classification Search
None
See application file for complete search history.

(56) References Cited

U.S. PATENT DOCUMENTS

| 6,205,431 | B1 * | 3/2001 | Willemain et al. ........... 705/7.25 |
| 6,910,017 | B1 * | 6/2005 | Woo et al. ..................... 705/7.29 |
| 2002/0107720 | A1 * | 8/2002 | Martin ............................. 705/10 |
| 2005/0154560 | A1 * | 7/2005 | Fitzpatrick et al. ........... 702/182 |

OTHER PUBLICATIONS

A. Papoulis, "Probability, Random Variables, and Stochastic Process", McGraw-Hill Inc., Third Edition, (1997), (pp. 63-85 and 285-315).
Ricahrd O. Duda et al., "Pattern Classification", Wiley Publications, Second Edition, (2001), (pp. 128-139).
C.E. Shannon, "A Mathematical Theory of Communication", The Bell System Technical Journal, vol. 27, (1948), (pp. 379-423 and 623-656).
Lindsay I. Smith, "A Tutorial on Principal Components Analysis", (Feb. 2002), (26 pages), http://csnet.otago.ac.nz/cosc453/student tutorials/principal components.pdf.
M.K. Jain et al., "Numerical Methods for Scientific and Engineering Computations", New Age Publications, Third Edition, (1993), (pp. 307-308).

* cited by examiner

*Primary Examiner* — Susanna M Meinecke Diaz
*Assistant Examiner* — Ashley Y Young
(74) *Attorney, Agent, or Firm* — The Webb Law Firm

(57) ABSTRACT

Predicting future sales of a product includes determining a first, historical sales rate curve of historical sales of the product and determining a second sales rate curve for a time t from sales of the product occurring up to a time t−1. The second sales rate curve is determined for a window of time W that includes time t, the window of time W has a shorter duration than the first sales rate curve, and the first and second sales rate curves are for different periods of time. The second sales rate curve is compared to the first sales rate curve and a section of the first sales rate curve is identified based on predetermined criteria for the comparison. Future sales of the product are predicted as a function of a portion of the first sales rate curve in time after the identified section of the first sales rate curve.

18 Claims, 7 Drawing Sheets

REAL-TIME DEMAND PREDICTION IN A FAST SERVICE RESTAURANT ENVIRONMENT

CROSS REFERENCE TO RELATED APPLICATION

This application claims priority from U.S. Provisional Patent Application No. 60/873,397, filed Dec. 7, 2006, the contents of which are incorporated herein by reference.

BACKGROUND OF THE INVENTION

1. Field of the Invention

The present invention relates to predicting real-time sales of food products in a quick-service restaurant.

2. Description of Related Art

Predicting actual sales of a particular food product is a very complex and open problem in the quick-service industry. Conventionally, the future or predicted sale of a food product is approximated from prior sales obtained directly from a point-of-sale (POS) device, such as an electronic order station in a restaurant, e.g., a quick-service restaurant. More specifically, this approximation is accomplished by averaging historical sale information for the food product. While this method has been prevalent for many years in the industry, it has been reported by major quick-service restaurant chains that this method provides a non-optimal estimate of sales.

Accordingly, a need exists for an improved method of predicting future demand (sales) of a food product.

SUMMARY OF THE INVENTION

In general, a system, method and computer readable program code for predicting real-time sales of food products in a quick-service restaurant includes: a means, step or module for obtaining data from a measurement device; a means, step or module for conditioning the data obtained from the measurement device; a means, step or module for transforming the conditioned data to a new domain; a means, step or module for storing the transformed data; and a means, step or module which uses the transformed historical data and real-time measured data to predict real-time sales.

Transformation converts "unstructured", "non-causal", "non-stationary" sales data from the measurement device into meaningful form. The converted meaningful data can be called a random variable and is later used in stochastic process modeling framework to obtain a real estimate of sales.

More specifically, one embodiment of the invention is a method of predicting future sales of a product. The method includes (a) electronically storing a first, historical sales rate curve of historical sales of a product; (b) electronically determining for a time t a second sales rate curve for sales of the product up to a time t−1, wherein the second sales rate curve is determined for a window of time W that includes time t, the window of time W has a duration less than the first sales rate curve, and the first and second sales rate curves are determined from actual sales data acquired during mutually exclusive periods of time; (c) electronically comparing the second sales rate curve to one or more portions of the first sales rate curve that have the same duration as window of time W; (d) electronically identifying a section of the first sales rate curve based on a best fit for the electronic comparison in step (c); and (e) electronically predicting future sales of the product as a function of a portion of the first sales rate curve in time after the section of the first sales rate curve identified in step (d), wherein each sale rate curve is a discrete time series approximation of a first order derivative of sales.

The second sales rate curve can be determined as a function of sales occurring in a window of time W and the information content of said sales.

The information content of the sales occurring in the window of time W can be determined as a function of a probability of the occurrence of each of said sales.

The first sales rate curve can be comprised of a plurality of historical sales rates, each of which is determined for a unique time t as a function of sales occurring in a historical window of time W that includes said time t and the information content of said sales, wherein the plurality of historical sales rates are ordered temporally based on the occurrence of their corresponding times t.

The information content of the sales occurring in the historical window of time W can be determined as a function of a probability of the occurrence of each of said sales.

The section of the second sales rate curve in step (d) can have the same duration as window of time W.

Another embodiment of the invention is a system for predicting future sales of a product. The system includes means for storing a first, historical sales rate curve of historical sales of a product; means for determining for a time t a second sales rate curve for sales of the product up to a time t−1, wherein the second sales rate curve is determined for a window of time W that includes time t, the window of time W has a duration less than the first sales rate curve, and the first and second sales rate curves are determined from actual sales data acquired during mutually exclusive periods of time; means for comparing the second sales rate curve to one or more portions of the first sales rate curve that have the same duration as window of time W; means for identifying a section of the first sales rate curve based on a best fit for the electronic comparison; and means for predicting future sales of the product based on a portion of the first sales rate curve in time after the identified section of the first sales rate curve, wherein each sale rate curve is a discrete time series approximation of a first order derivative of sales.

The second sales rate curve can be determined as a function of sales occurring in a window of time Wand the information content of said sales.

The information content of the sales occurring in the window of time W can be determined as a function of a probability of the occurrence of each of said sales.

The first sales rate curve can be comprised of a plurality of historical sales rates, each of which is determined for a unique time t as a function of sales occurring in a historical window of time W that includes said time t and the information content of said sales, wherein the plurality of historical sales rates are ordered temporally based on the occurrence of their corresponding times t.

The information content of the sales occurring in the historical window of time W can be determined as a function of a probability of the occurrence of each of said sales.

The second sales rate curve in step (d) can have the same duration as window of time W.

Lastly, another embodiment of the invention is a computer readable medium having stored thereon computer readable program code which, when executed by a processor, causes the processor to perform the steps of: (a) electronically store a first, historical sales rate curve of historical sales of a product; (b) electronically determine for a time t a second sales rate curve for sales of the product up to a time t−1, wherein the second sales rate curve is determined for a window of time W that includes time t, the window of time W has a duration less than the first sales rate curve, and the first and second sales rate curves are determined from actual sales data acquired during mutually exclusive periods of time; (c) electronically compare the second sales rate curve to one or more portions of the first sales rate curve that have the same duration as window of time W; (d) electronically identify a section of the first sales rate curve based on best fit for the electronic comparison in step (c); and (e) electronically predict future sales of the product based on a portion of the first sales rate curve in time after the section of the first sales rate curve identified in step (d), wherein each sale rate curve is a discrete time series approximation of a first order derivative of sale.

The second sales rate curve can be determined as a function of sales occurring in a window of time W and the information content of said sales.

The information content of the sales occurring in the window of time W can be determined as a function of a probability of the occurrence of each of said sales.

The first sales rate curve can be comprised of a plurality of historical sales rates, each of which is determined for a unique time t as a function of sales occurring in a historical window of time W that includes said time t and the information content of said sales, wherein the plurality of historical sales rates are ordered temporally based on the occurrence of their corresponding times t.

The information content of the sales occurring in the historical window of time W can be determined as a function of a probability of the occurrence of each of said sales.

The section of the second sales rate curve in step (d) can have the same duration as window of time W.

BRIEF DESCRIPTION OF THE DRAWING(S)

DETAILED DESCRIPTION OF THE INVENTION

Figure 1:
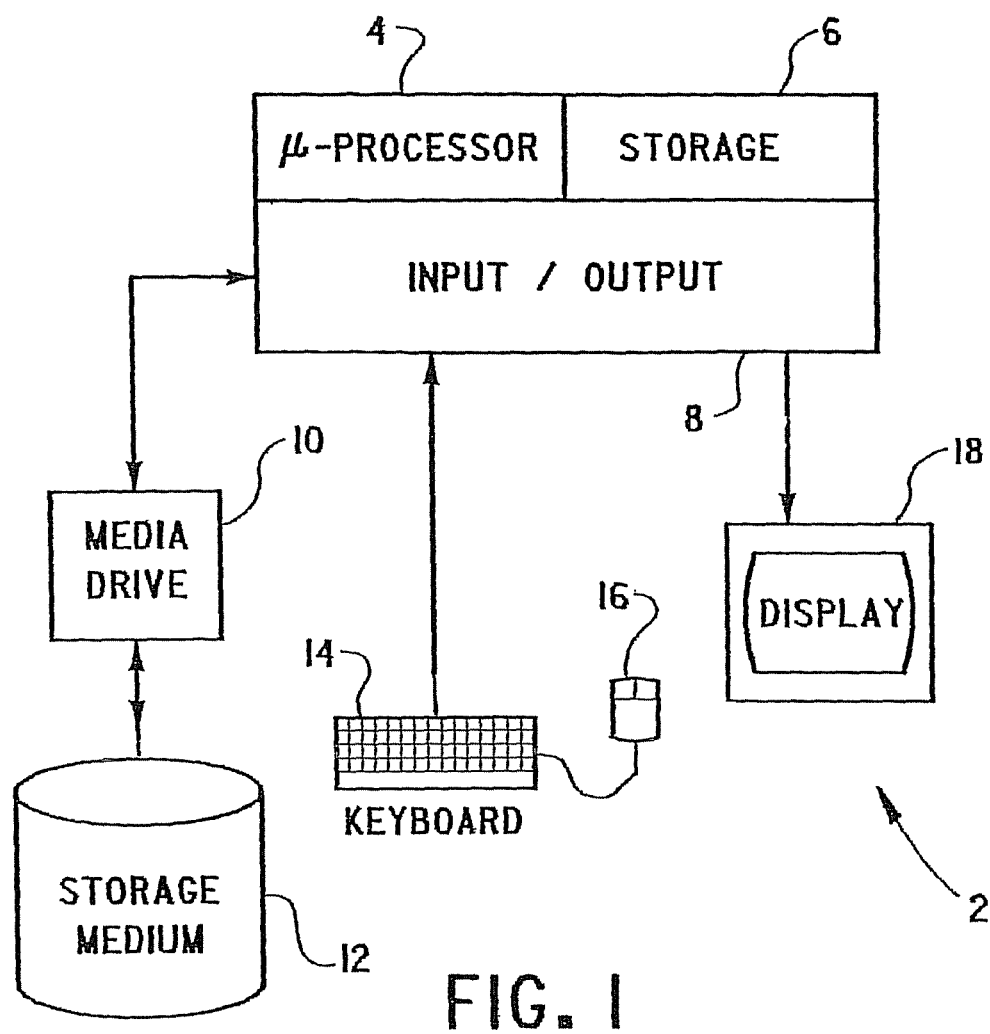
FIG. 1 is a diagrammatic illustration of an exemplary computer system that can execute computer readable program code that embodies the present invention.
Figure 2:
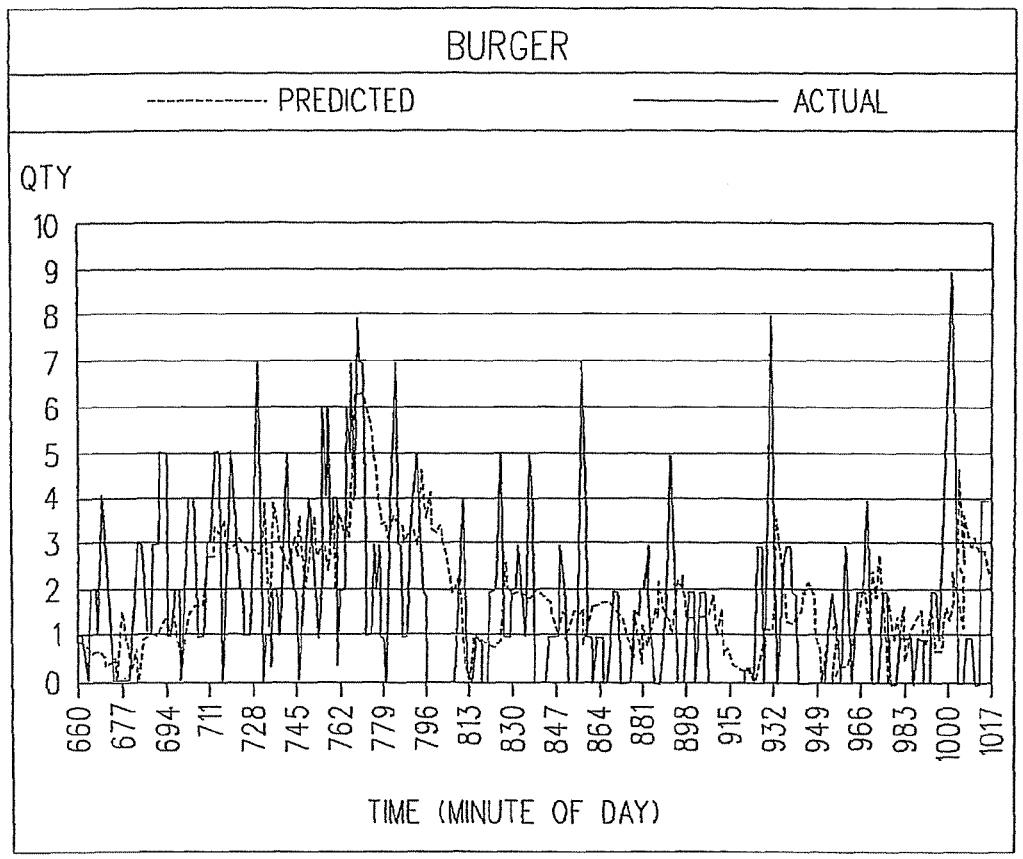
FIGS. 2-7 are graphs of quantity versus time showing predicted demand and actual demand for a number of different food products, wherein the predicted demand for each food product is determined in the manner described herein.
Figure 3:
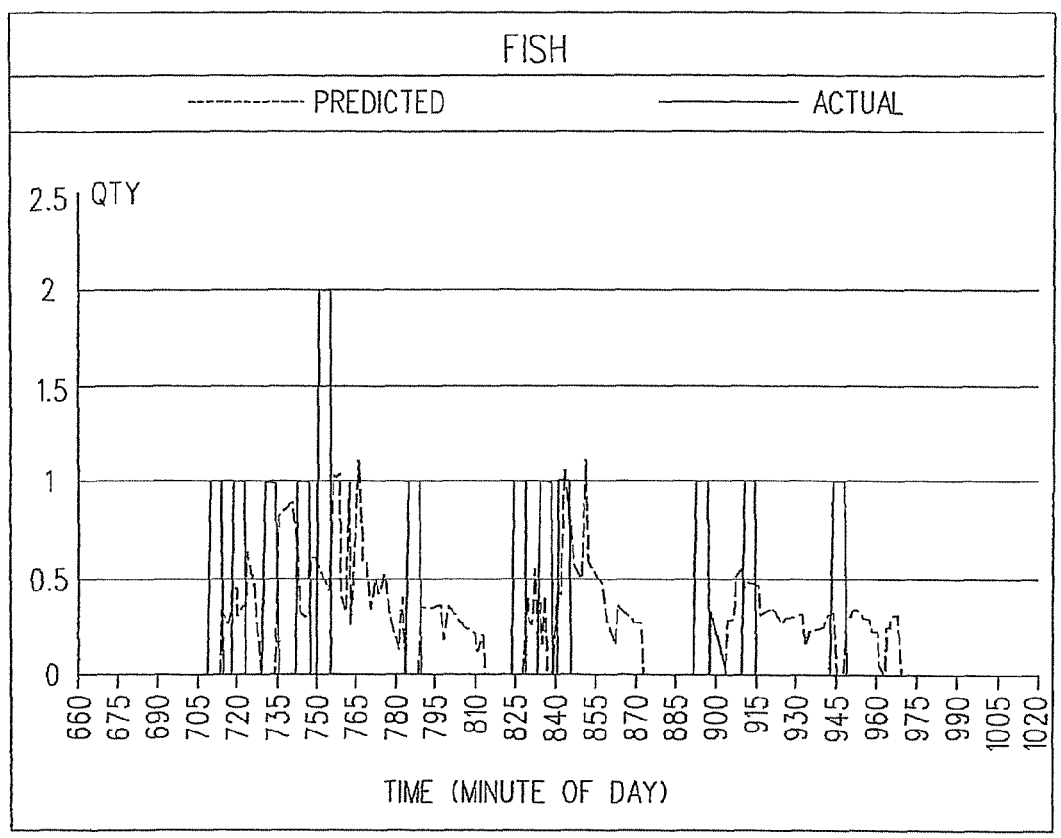
Figure 4:
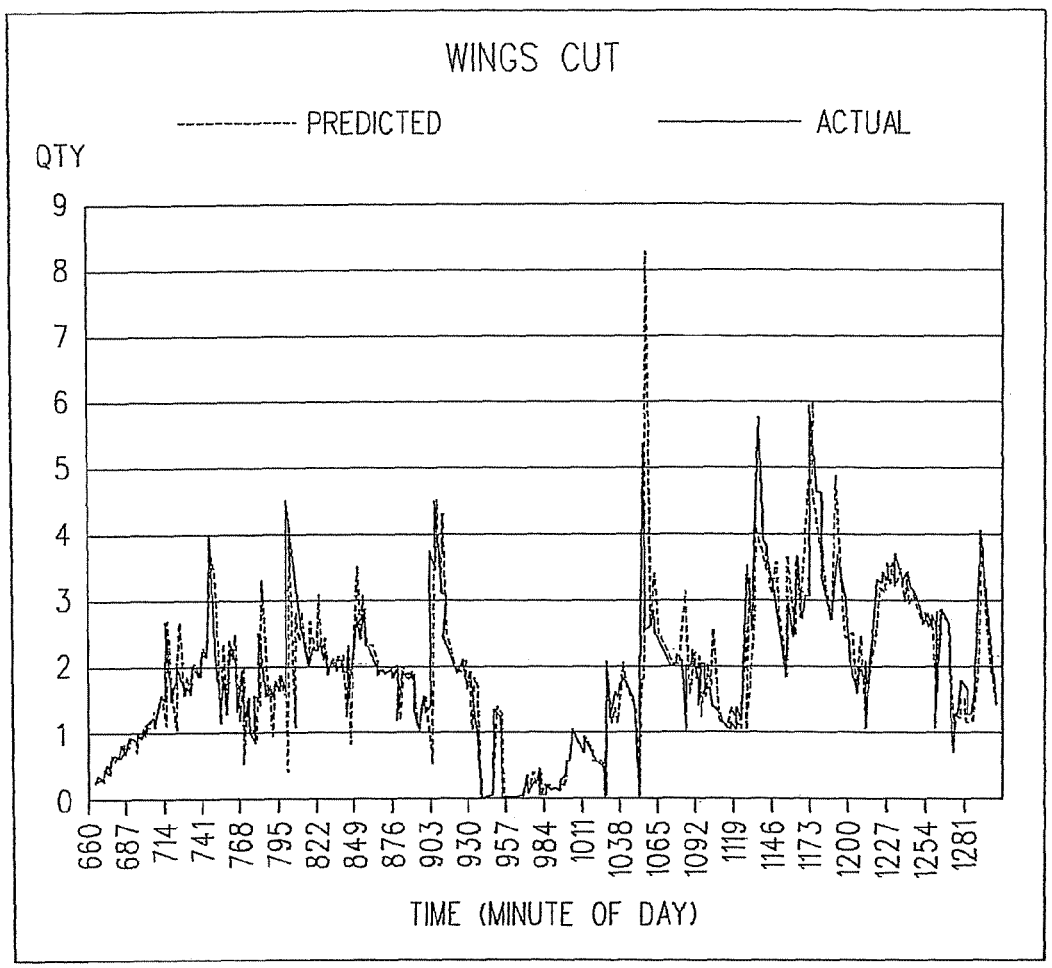
Figure 5:
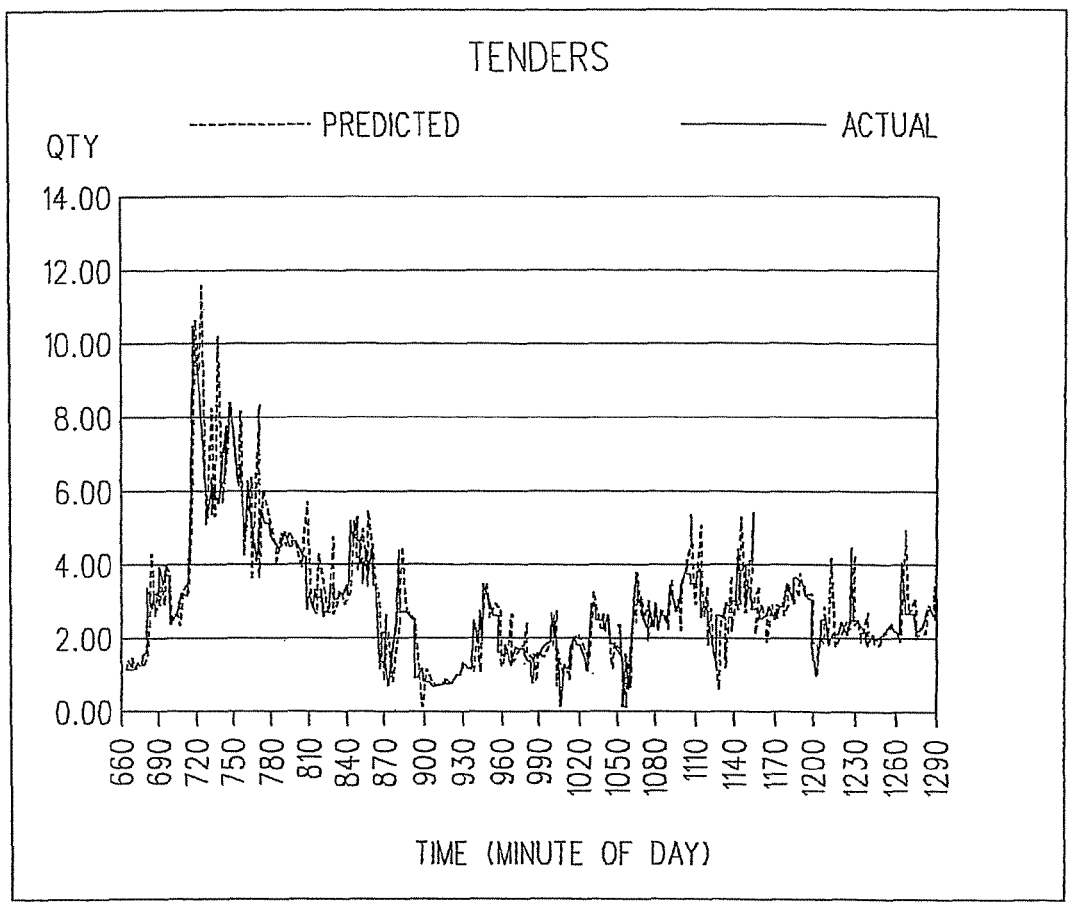
Figure 6:
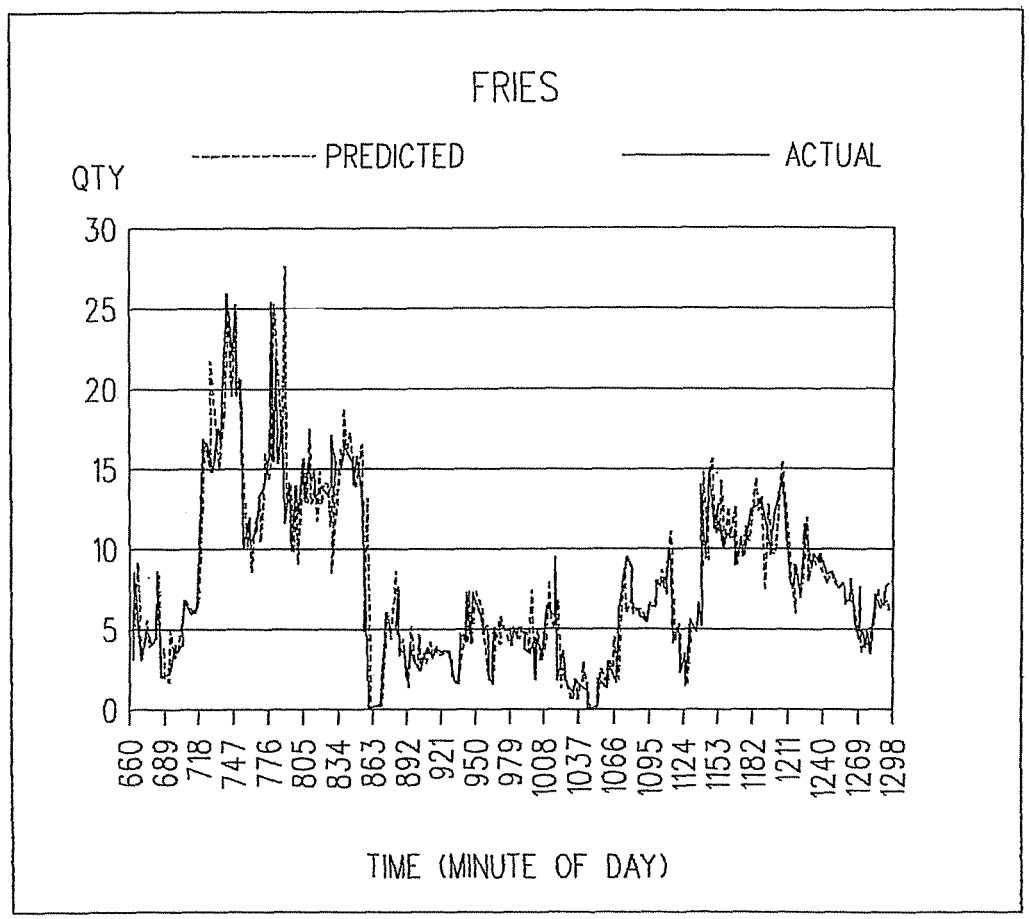
Figure 7:
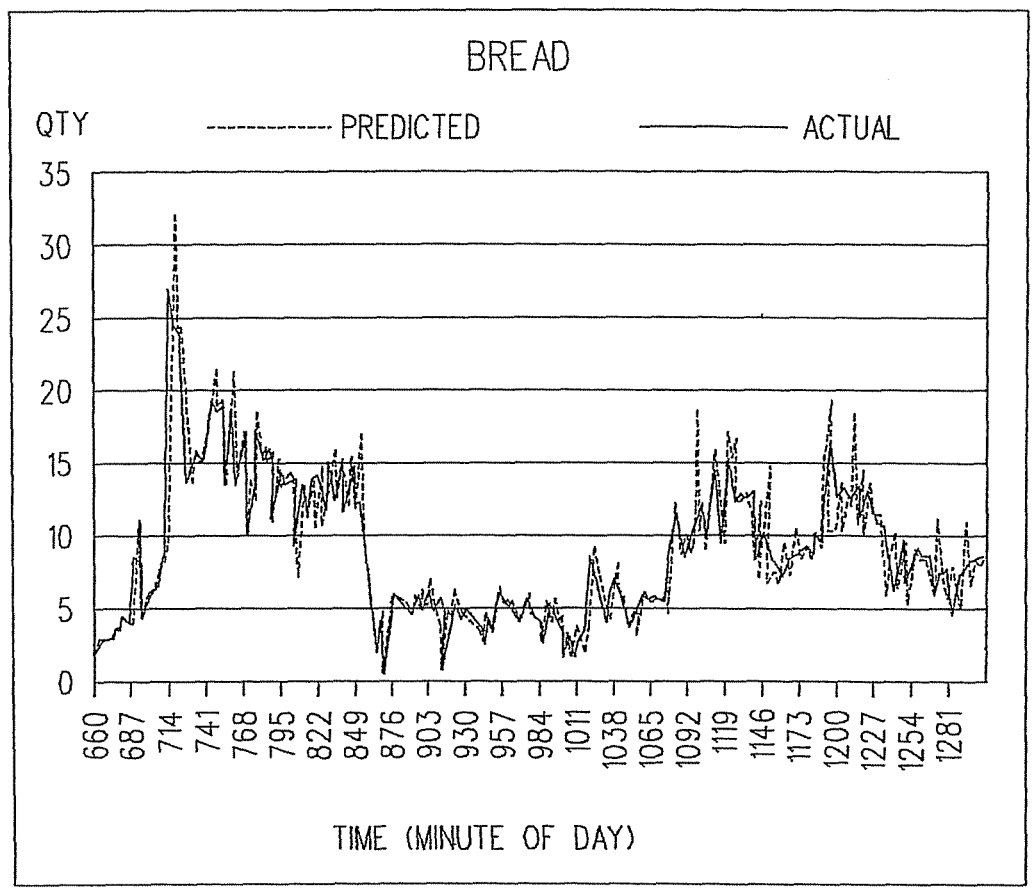

With reference to FIG. 1, the present invention is embodied in computer-readable program code which executes on one or more standalone or networked computers 2 that individually or collectively form a point-of-sale (POS) device or system. Each computer 2 includes a microprocessor 4, a computer storage 6 (e.g., without limitation, RAM, ROM and the like) and an input/output system 8. Each computer system 2 can also include a media drive 10, such as a disk drive, CD-ROM drive, and the like. Media drive 10 can operate with a computer-usable storage medium 12 (e.g., without limitation, a hard drive, a flash memory, and the like) capable of storing the computer-readable program code that embodies the present invention, which computer-readable program code is able to configure and operate computer system 2 in a manner to implement the present invention. Input/output system 8 can include a keyboard 14, a mouse 16 and/or a display 18. Computer system 2 is exemplary of a computer system capable of executing the computer-readable program code of the present invention and is not to be construed in any manner as limiting the invention.

A method of predicting the future sales of a food product will now be described.

As discussed above, it has been observed that prior art sales rate curves are poor predictors of future sales of a food product. Thus, herein, a new sales rate curve for the food product is defined by the following equation EQ1.

$$\text{Sales Rate}(t) = \frac{\sum_{i=1}^{i=W} \text{Sales}(i)}{W};$$ EQ 1 where, W is a so-called maximum entropy window at time t, also referred to herein as "the optimal time window"; and Sales(i) is each sale i of the food product that occurs in window W.

Sales(i) for the food product is collected, e.g., from a POS device or system, in the form of a time-series of sales of the food product for a period of time of interest, e.g., day, week, month, or any other suitable and/or desirable period of time. This time-series is then quantized using a linear operation to obtain sales per every interval of time, e.g., without limitation, every minute, in window W.

This time-series sales data is filtered to remove noise (rare or spurious events). In the sale of a food product, it can be assumed that there is no measurement noise. However, bursts of certain spurious/rare events are observed in practice. These spurious events take the form of spurious sale events which are either too low in quantity, e.g., a single standalone order of fries versus an order for a meal that includes an order of fries, too high in quantity, e.g., twenty standalone orders of fries, or have too low a frequency. These spurious events skew the data which is later used for learning any useful characteristics of sale events. This problem becomes more pronounced when the data is very sparse. An example of this is the sale of two hundred chicken wings in a single order, when the sale of chicken wings is, for example, already sporadic.

A solution to remove this noise is to use a probabilistic filter algorithm that uses a normalized frequency histogram to discriminate "acceptable" sales events and "rare" sales events. It can be assumed that the probability of rare sales events is roughly 5-10% of the most frequently occurring event.

The following algorithm ALG1 can be used to implement a suitable probabilistic filter:

ALG1:

(1) Acquire time-series sales data for the sale of each food product of interest for a time period under consideration. This time-series sales data can include for each sale event of a food product, without limitation, quantity sold, time of day sold, day of week sold, and the like;

(2) Arrange the time-series data acquired in step (1) into a grid, with one axis of the grid representing the time period under consideration and the other axis of the grid representing the quantity of the food product sold at each point in time represented by the grid;

(3) Compute a histogram for the acquired time-series data;

(4) Normalize the histogram with the total sum of the sales of the food product for the time period under consideration;

(5) Threshold the normalized histogram using entropy, i.e., compute the entropy of the distribution, which entropy is given by the following equation EQ2:

$$\text{Entropy} = -\log(1/p_i),$$ EQ2 where $p_i$ is the probability of occurrence of each sale i of the food product determined using a normalized frequency count; and (6) Classify events within some percentage of the threshold determined in step (5) as "acceptable" sales events, which are retained for future processing hereinafter, and classify sales events outside of this percentage as "rare" sales events and are not used hereinafter.

Using the sales events classified as "acceptable" in ALG1 above, the historical sales rate for each food product of interest can be estimated for each time instance t (e.g., each minute) of the period of time of interest, e.g., day, week, month, or any other suitable and/or desirable period of time period, utilizing the following algorithm ALG2.

ALG2:

For each time instance t:

(1) Initialize an arbitrary sized time-window W that includes time instance t, e.g., t is the upper boundary of time-window W;

(2) Bin each sales event i that occurred in time-window W by quantity, e.g., each sale of a single cheeseburger in bin v1, each sale of two cheeseburgers in bin v2, each sale of three cheeseburgers in bin v3, and so forth;

(3) Compute the probability $p_i$ of the occurrence of each sale event i in time-window W using a normalized frequency count;

(4) Compute the information content in time-window W using the following equation EQ3:

$$I(W) = -\sum_{i=1}^{m} p_i \log(p_i) \quad \text{EQ 3}$$

where i is each sale event in window W; and
m is the total number of sales events in window W;

(5) Increment the size of time-window W and repeat steps (ii)-(iv) therefor;

(6) Repeat step (5) until a maximum value of I(W) is found. The maximum value of I(W) means that W is the optimal time window for time k, i.e., the window that has maximum information (it has been observed that a single maximum value of I(W) is found every time); and (7) Solve equation EQ1 for the value of W determined in step (vi) to determine the Sales Rate(t) at time instance t.

W is the optimal Entropy Window, also referred to as the optimal time window. The size of this window W (in terms of time) is directly related to the "optimal amount" of sales data that should be considered for any meaningful computation. It has been observed that the size window W (in terms of time) can be, and is typically, different for each time instance t evaluated using ALG2.

In contrast to the prior art, wherein average sales data (not sales rate data) over one or more time windows has historically been used to analyze historical sales consumption patterns, then use those patterns to predict future sales patterns, it has been observed that sales data transformed into sales rate utilizing equation EQ1 satisfies the requirement of a good random variable for the purpose or predicting future sales of a food product.

ALG2 (which utilizes equation EQ1) is utilized to determine a sales rate for each time instance t (e.g., minute) in the period of time of interest.

Next, a curve of sales rate versus time for the period of time of interest is formed by ordering all of the sales rates determined for each time instance t in the period of time of interest in the same order as their corresponding time instances t occur in the period of time of interest, e.g., day, week, month, or any other suitable and/or desirable period of time. For example, in the curve of sales rate versus time, the sales rate r2 determined for time instance t2 immediately follows sales rate r1 determined for time instance t1; sales rate r3 determined for time instance t3 immediately follows sales rate r2 determined for time instance r2; and so forth for all of the sales rates determined utilizing ALG2 for all of the time instances t in the period of time of interest.

Next, a so-called Predictor used for predicting future sales of a particular food product will be described with reference to the following algorithm ALG3.

ALG3:

(1) Utilize ALG1 and ALG2 in the manner described above to generate historical sales rate curves from historical sales data for the food product, with each sales rate curve representing a unique historical period of time of interest. Each unique historical period of time of interest can be any suitable and/or desirable historical period of time of interest, such as, without limitation, a day, a week or a month, whereupon each unique historical period of time of interest will have a unique sales rate curve associated therewith. Desirably, all of the unique historical periods of time of interest are for the same time interval, e.g., a week, for the purpose of predicting future sales.

(2) Determine the Mean and Covariance statistics for all of the historical sales rate curves generated in step (1) of ALG3. For example, without limitation, Mean and Covariance statistics can be determined for two or more weeks of historical sales rate curves.

Utilizing the historical sales rate curves generated in step (1) of ALG3 and the Mean and Covariance statistics for all of the historical sales rate curves generated in step (2) of ALG3, a future real-time sales rate pattern can be predicted as follows.

(3) During the course of a particular period of time of interest, e.g., during the course of a particular work day, acquire data regarding sales occurring during said period of time and determine therefrom a real-time sales rate curve utilizing ALG2 above. More specifically, for each time instance t in the particular period of time of interest, acquire sales data up to time instance (t−1). This sales data is then input into ALG2 above to determine for time instance t a real-time sales rate curve (Sales Rate(t)) for a time window W, the duration of which is determined by ALG 2 and is not fixed. Desirably, this real-time sales rate curve is determined as time instance t occurs. However, this is not to be construed in a limiting sense.

(4) Next, match the real-time sales rate curve for the time window W determined in step (3) of ALG3 to a portion of one of the historical sales rate curves where the real-time sales rate curve for the time window W fits best. This matching can be viewed as comparing the real-time sales rate curve for the time window W determined in step (3) of ALG3 to each portion of each historical sales rate curve having the same time duration as time window W determined in step (3) of ALG3 to find that portion of all of the historical sales rate curves that best fits (or is a best match) to the real-time sales rate curve for the time window W determined in step (3) of ALG3.

Matching of the real-time sales rate curve for the time window W determined in step (3) of ALG3 to that portion of one of the historical sales rate curves where the real-time sales rate curve for the time window W fits best can be accomplished in any suitable and/or desirable manner, including well-known statistical matching techniques, such as Mahalanobis distance.

The section of the historical sales rate curve that is identified to be the best fit to the real-time sales rate curve for the time window W determined in step (3) of ALG3 is then used to perform prediction in the manner described next.

(5) Next, starting from the section of the historical sales rate curve identified in step (4) of ALG3, the historical sales rate curve that occurs in the next window of time w is identified on the historical sales rate curve. Thus, for example, without limitation, if the section of the historical sales rate curve identified in step (4) of ALG3 is that portion of the curve between 5:05 pm and 5:10 pm (i.e., the duration of time window W), the next time-section (i.e., the next window of time w) of the historical sales rate curve identified in this step (5) of ALG3 after 5:10 pm, e.g., without limitation, between 5:10 pm and 5:15 pm, is identified. Desirably, time windows W and w have the same duration.

(6) Because the sales process is stochastic and non-linear in nature, linear approximation, e.g., a polynomial series approximation, such as the well-known Taylor Series expansion, is desirably applied to linearize the historical sales rate pattern to occur in the next window of time w (after time t) identified in step (5) of ALG3.

(7) Using the linearized historical sales rate pattern of step (6) of ALG3, the predicted real-time sales rate pattern to occur in the next window of time w (after time t) can be predicted (approximated) using the following equation EQ4:

$$PredictedSaleRate(t) = SaleRateHist(t)\left(1 + \frac{(SalesRateHist(t) - avgSalesHist(t+w))}{avgSalesHist(t+w)}\right) \quad \text{EQ 4}$$

where w is the prediction time window, e.g., the next window of time;
SalesRateHist is the linearized historical sales rate pattern determined in step (6) of ALG3; and
avgSalesHist is the average sales obtained from the data used to generate the historical sales rate identified in step (6) of ALG3.

(8) Lastly, the prediction of the real-time sales rate for the next window of time w is obtained by integrating the PredictedSaleRate(t) determined in step (7) of ALG3 from time t to time t+w.

The "next window of time w" described above is desirably a so-called "look-ahead window" which corresponds with the time it takes to replenish the food product level through a cooking cycle. This is achieved by setting the "next window of time w" to be a factor of cook cycle (which is different for each food product). This can be understood better with reference to the following graph. For pragmatic reasons, it is desirable that the "next window of time w" be twice the cook cycle. Thus, when at time t, one should desirably be predicting for t+2cookcycle. However, this is not to be construed in a limiting sense since any suitable and/or desirable duration look-ahead window can be utilized.

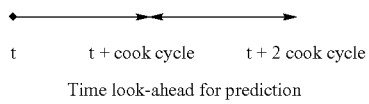

t      t + cook cycle      t + 2 cook cycle

Time look-ahead for prediction

Steps (3)-(8) in ALG3 above can be repeated for each time instance t during the course of a particular period of time of interest (during the course of a work day) in order to provide a real-time prediction of sales of a food product to occur within a predetermined period of time after time instance t, i.e., the next window of time w.

Experiment Results

With reference to FIGS. 2-7, experimental results were obtained via ALG3, and hence via ALG1 and ALG2, on POS data obtained from a wide variety of restaurants for following food products: Burger (chicken and Angus); Fish; Wing Cuts; Tenders; Fries; and Bread, respectively.

As can be seen from FIGS. 2-7, the predicted demand determined via ALG3, and hence via ALG1 and ALG2, track the actual sales with low error.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of predicting future sales rate of a product comprising:
(a) electronically storing a first, historical sales rate curve of historical sales of a product;
(b) electronically determining for a time t a second sales rate curve for sales of the product up to a time t−1, wherein the second sales rate curve is determined for a window of time W that includes time t, the window of time W has a duration less than the first sales rate curve, and the first and second sales rate curves are determined from actual sales data acquired during mutually exclusive periods of time;
(c) electronically comparing the second sales rate curve to one or more portions of the first sales rate curve that have the same duration as window of time W;
(d) electronically identifying a section of the first sales rate curve based on a best fit for the electronic comparison in step (c); and
(e) electronically predicting future sales rate of the product based on integration of the following equation from time t to a time t+w;

$$SaleRateHist(t)\left(1 + \frac{(SalesRateHist(t) - avgSalesHist(t+w))}{avgSalesHist(t+w)}\right)$$

where:
w is a window of time of the first sales rate curve after the section of the first sales rate curve identified in step (d),
SalesRateHist is an historical sales rate pattern, and
avqSalesHist is average sales, and
wherein each sale rate curve is a discrete time series approximation of a first order derivative of sales.

2. The method of claim 1, wherein the second sales rate curve is determined based on sales occurring in the window of time W and information content of said sales.

3. The method of claim 2, wherein the information content of the sales occurring in the window of time W is determined based on a probability of the occurrence of each of said sales.

4. The method of claim 1, wherein the first sales rate curve is comprised of a plurality of historical sales rates, each of which is determined for a unique time t based on sales occurring in a historical window of time W that includes said time t and information content of said sales, wherein the plurality of historical sales rates are ordered temporally based on the occurrence of their corresponding times t.

5. The method of claim 4, wherein the information content of the sales occurring in the historical window of time W is determined based on a probability of the occurrence of each of said sales.

6. The method of claim 1, wherein the section of the first sales rate curve in step (d) has the same duration as the window of time W.

7. A system for predicting future sales rate of a product comprising:
  means for storing a first, historical sales rate curve of historical sales of a product;
  means for determining for a time t a second sales rate curve for sales of the product up to a time t−1, wherein the second sales rate curve is determined for a window of time W that includes time t, the window of time W has a duration less than the first sales rate curve, and the first and second sales rate curves are determined from actual sales data acquired during mutually exclusive periods of time;
  means for comparing the second sales rate curve to one or more portions of the first sales rate curve that have the same duration as window of time W;
  means for identifying a section of the first sales rate curve based on a best fit for the electronic comparison; and
  means for predicting future sales rate of the product based on integration of the following equation from time t to a time t+w;

$$SaleRateHist(t)\left(1 + \frac{(SalesRateHist(t) - avgSalesHist(t+w))}{avgSalesHist(t+w)}\right)$$

where:
  w is a window of time of the first sales rate curve after the section of the first sales rate curve identified by the means for identifying,
  SalesRateHist is an historical sales rate pattern, and avqSalesHist is average sales, and
  wherein each sale rate curve is a discrete time series approximation of a first order derivative of sales.

8. The system of claim 7, wherein the second sales rate curve is determined based on sales occurring in the window of time W and information content of said sales.

9. The system of claim 8, wherein the information content of the sales occurring in the window of time W is determined based on a probability of the occurrence of each of said sales.

10. The system of claim 7, wherein the first sales rate curve is comprised of a plurality of historical sales rates, each of which is determined for a unique time t based on sales occurring in a historical window of time W that includes said time t and information content of said sales, wherein the plurality of historical sales rates are ordered temporally based on the occurrence of their corresponding times t.

11. The system of claim 10, wherein the information content of the sales occurring in the historical window of time W is determined based on a probability of the occurrence of each of said sales.

12. The system of claim 7, wherein the section of the first sales rate curve identified by the means for identifying has the same duration as the window of time W.

13. A non-transitory computer readable medium having stored thereon non-transitory computer readable program code which, when executed by a processor, causes the processor to perform the steps of:
  (a) electronically store a first, historical sales rate curve of historical sales of a product;
  (b) electronically determine for a time t a second sales rate curve for sales of the product up to a time t−1, wherein the second sales rate curve is determined for a window of time W that includes time t, the window of time W has a duration less than the first sales rate curve, and the first and second sales rate curves are determined from actual sales data acquired during mutually exclusive periods of time;
  (c) electronically compare the second sales rate curve to one or more portions of the first sales rate curve that have the same duration as window of time W;
  (d) electronically identify a section of the first sales rate curve based on a best fit for the electronic comparison in step (c); and
  (e) electronically predict future sales of the product based on integration of the following equation from time t to a time t+w;

$$SaleRateHist(t)\left(1 + \frac{(SalesRateHist(t) - avgSalesHist(t+w))}{avgSalesHist(t+w)}\right)$$

where:
  w is a window of time of the first sales rate curve after the section of the first sales rate curve identified in step (d),
  SalesRateHist is an historical sales rate pattern, and avgSalesHist is average sales, and
  wherein each sale rate curve is a discrete time series approximation of a first order derivative of sales.

14. The non-transitory computer readable medium of claim 13, wherein the second sales rate curve is determined based on sales occurring in the window of time W and information content of said sales.

15. The non-transitory computer readable medium of claim 14, wherein the information content of the sales occurring in the window of time W is determined based on a probability of the occurrence of each of said sales.

16. The non-transitory computer readable medium of claim 13, wherein the first sales rate curve is comprised of a plurality of historical sales rates, each of which is determined for a unique time t based on sales occurring in a historical window of time W that includes said time t and information content of said sales, wherein the plurality of historical sales rates are ordered temporally based on the occurrence of their corresponding times t.

17. The non-transitory computer readable medium of claim 16, wherein the information content of the sales occurring in the historical window of time W is determined based on a probability of the occurrence of each of said sales.

18. The non-transitory computer readable medium of claim 13, wherein the section of the first sales rate curve in step (d) has the same duration as the window of time W.

* * * * *